United States Patent [19]

Wade et al.

[11] 4,190,541
[45] Feb. 26, 1980

[54] WASTE WATER TREATMENT APPARATUS

[75] Inventors: Thomas B. Wade, Poplar Grove; James A. Knight, Pearl City, both of Ill.

[73] Assignee: Aqua-Aerobic Systems, Inc., Rockford, Ill.

[21] Appl. No.: 4,376

[22] Filed: Jan. 18, 1979

[51] Int. Cl.² ............................................. B01D 21/24
[52] U.S. Cl. ..................................... 210/241; 210/251; 210/525; 210/527; 210/532 R
[58] Field of Search ............... 210/526, 523, 525, 527, 210/532 R, 232, 236, 241, 251, 221, 298, 237, 288; 104/108, 107, 106, 94, 89, 172 R, 172 S, 162; 198/748, 678

[56] References Cited

U.S. PATENT DOCUMENTS

| | | | |
|---|---|---|---|
| 1,879,135 | 9/1932 | Downes et al. | 210/527 |
| 3,132,773 | 5/1964 | Hampton | 210/527 |
| 3,396,102 | 8/1968 | Forrest | 210/527 |
| 3,865,228 | 2/1975 | Hufford | 198/748 |
| 4,073,238 | 2/1978 | Knudsen | 104/172 S |

*Primary Examiner*—Frank Sever
*Attorney, Agent, or Firm*—Morsbach & Pillote

[57] ABSTRACT

A waste water treatment apparatus of the type in which a carriage support rail extends across the top of the tank intermediate the side walls of the tank and a carriage is mounted on the rail and driven by a carriage drive including an endless chain which reciprocates the carriage along the rail, and a tank cleaning head is mounted on the carriage for movement along a path adjacent the bottom of the tank. The carriage support rail is in the form of a box-shaped beam having inwardly directed flanges at its underside and the chain is mounted inside the box-shaped beam to be protectively enclosed in the beam and the carriage has wheel mounting portions extending upwardly into the beam at opposite sides of the chain and carriage support wheels mounted on the wheel mounting portions inside the beam and in rolling engagement with the flanges on the beam to support the carriage for movement therealong. The chain has upper and lower runs extending lengthwise of the tank and carries a drive lug, and the carriage has an upper and a lower follower alternately engaged by the drive lug as it moves respectively along the upper and lower runs of the chain to reciprocate the carriage.

12 Claims, 6 Drawing Figures

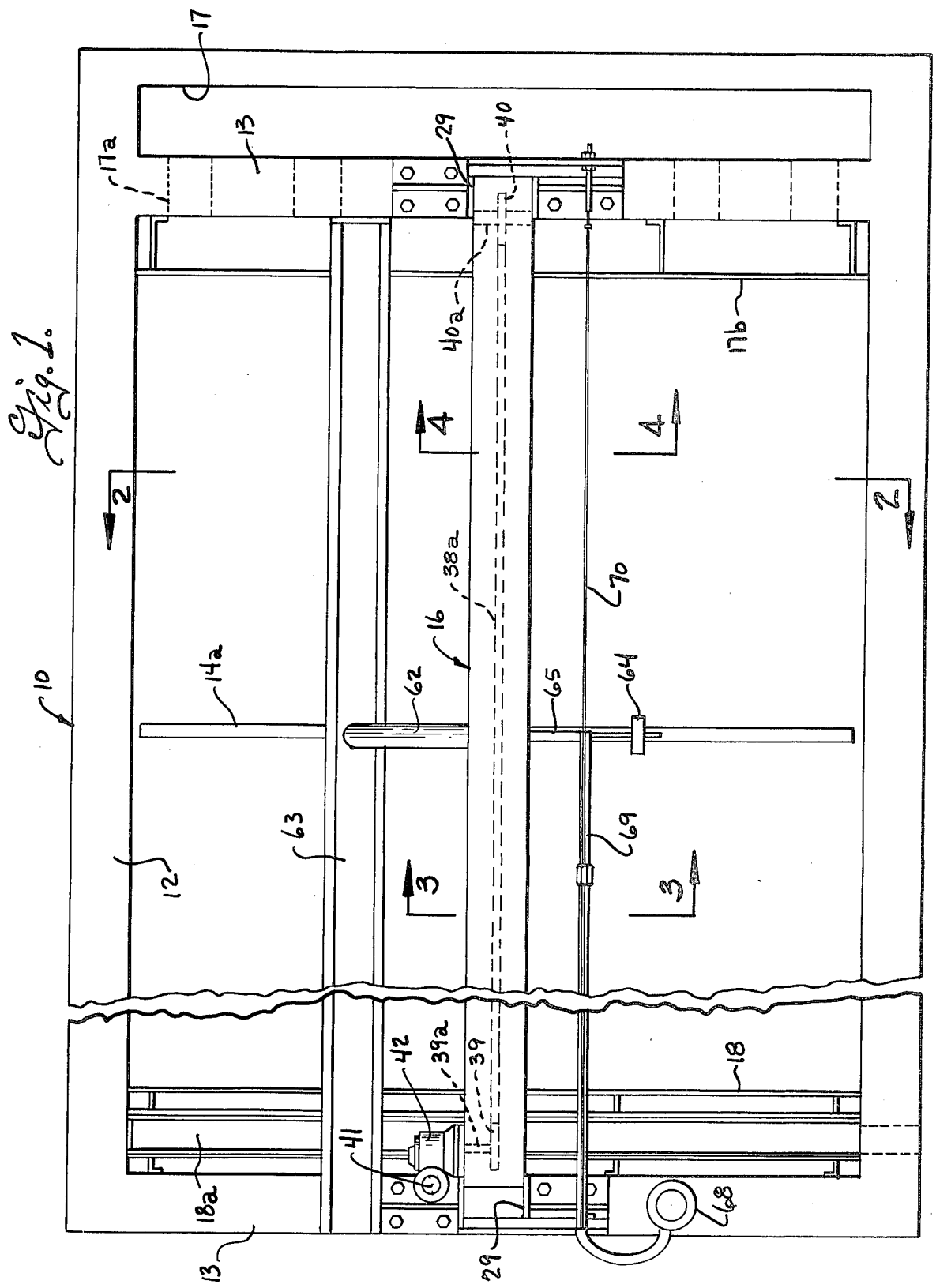

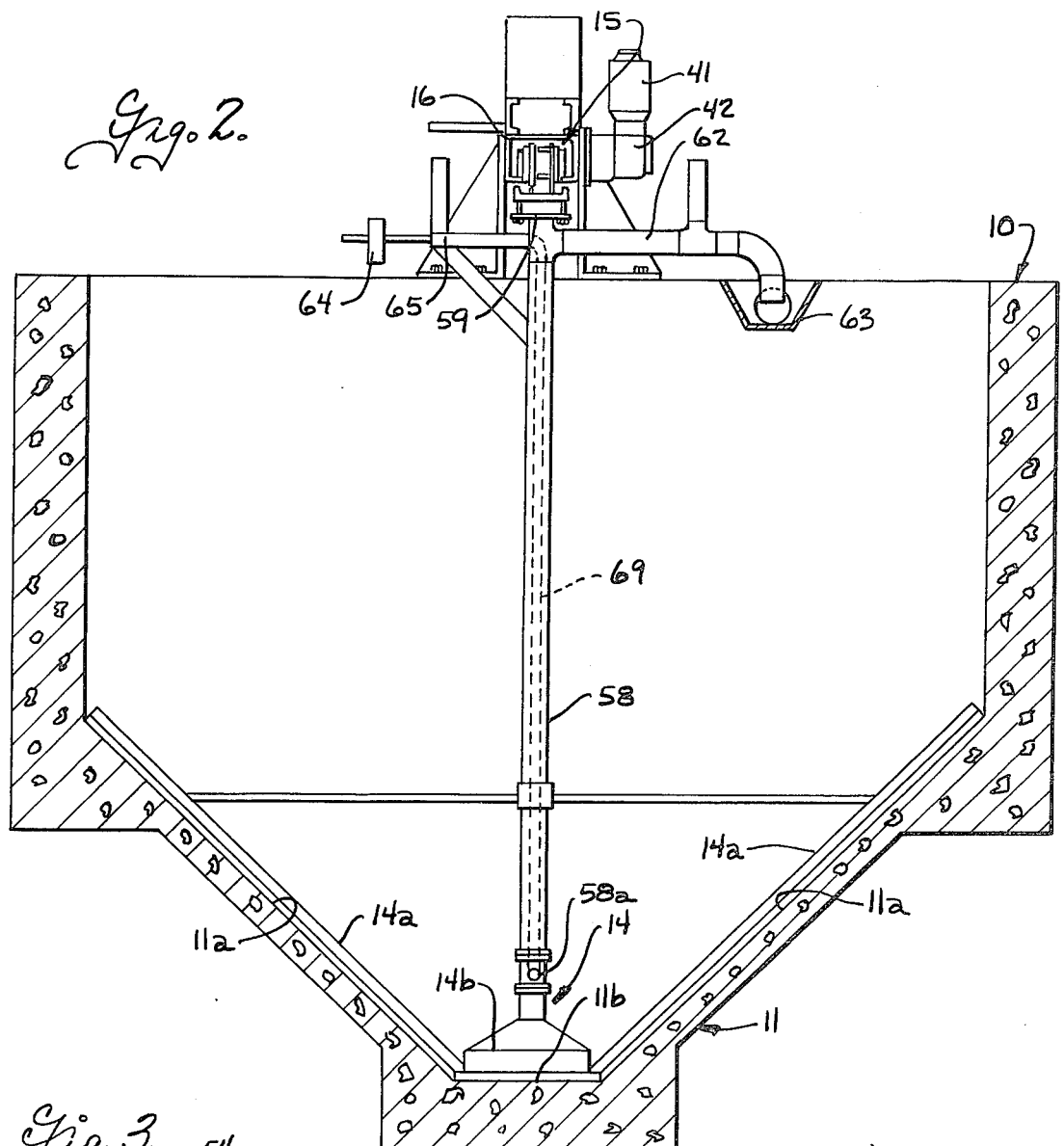
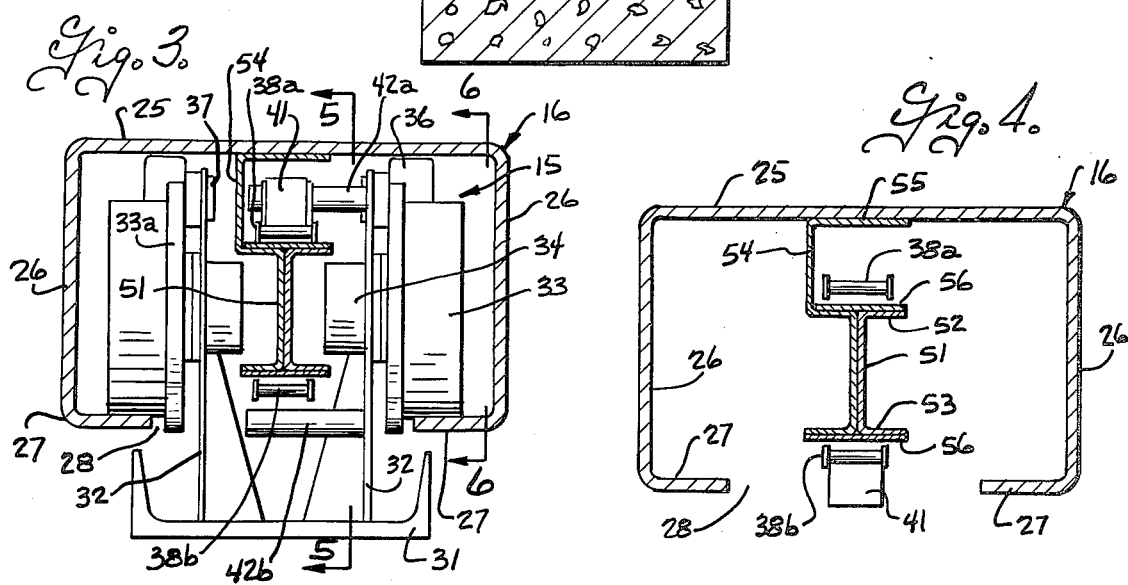

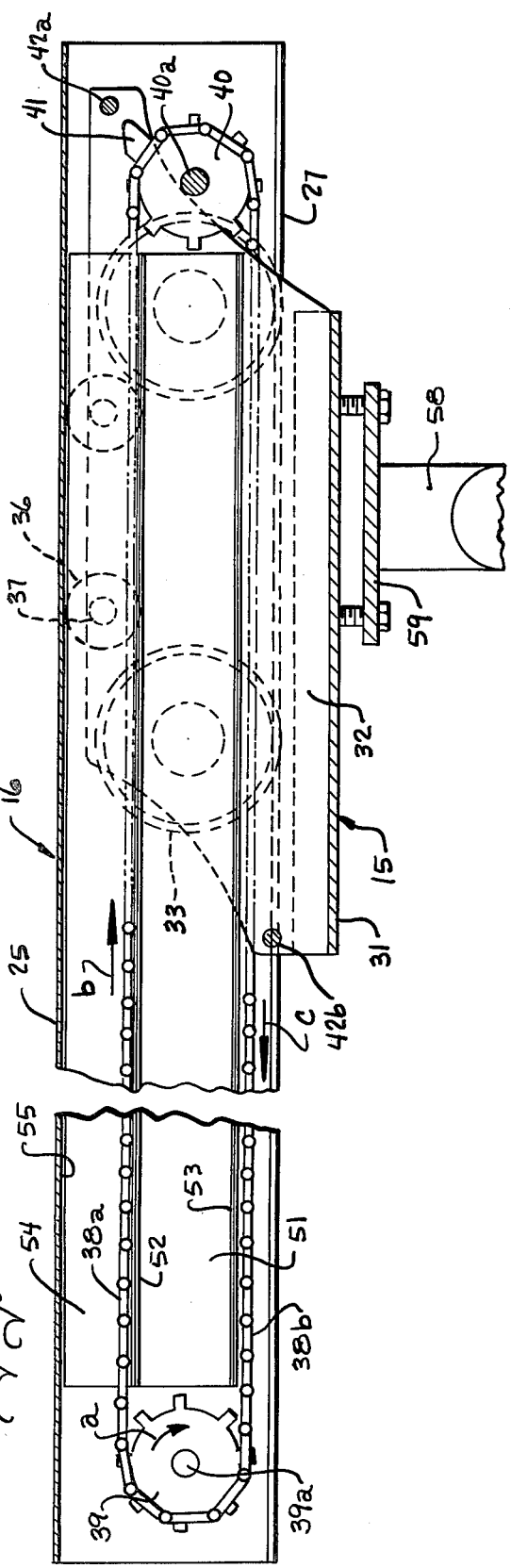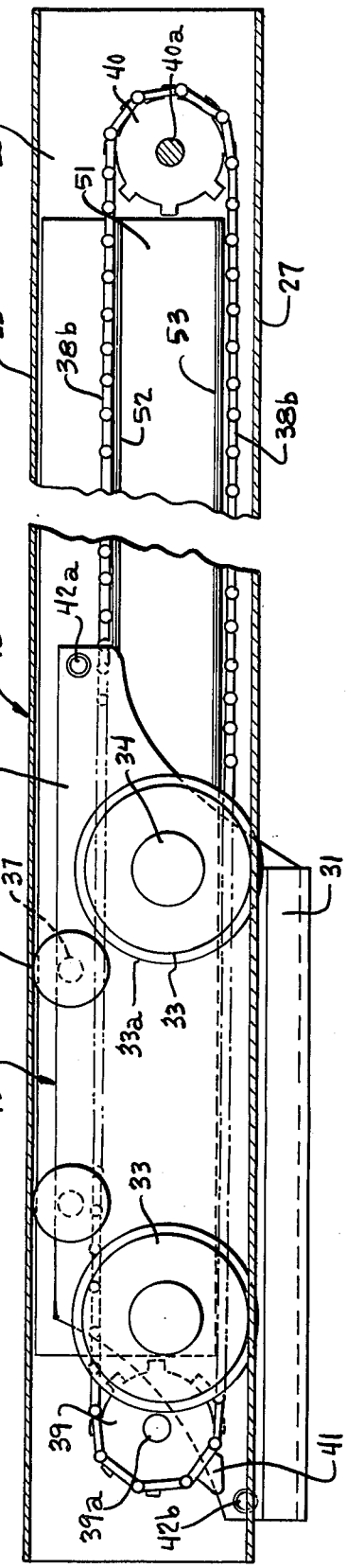

WASTE WATER TREATMENT APPARATUS

BACKGROUND OF THE INVENTION

It has heretofore been proposed for example as shown in U.S. Pat. Nos. 1,879,135, 3,132,773 and 3,396,102, to make a waste water treatment apparatus in which a carriage support rail extends across the top of the tank intermediate the side walls and a carriage is mounted on the rail and driven by a carriage drive including an endless chain that reciprocates the carriage along the rail and a tank cleaning head is connected to the carriage for movement thereby along a path adjacent the bottom of the tank. In the prior waste water treatment apparatus of this type, however, the chain drive and carriage were not enclosed so that the chain drive, carriage, and carriage support rail were exposed to the weather and it also presented a safety hazard to operating personel.

In order to simplify the controls and reduce the expense and power losses incident to use of a reversing motor drive to reciprocate the carriage, it has also been proposed, as disclosed in the aforementioned U.S. Pat. Nos. 1,879,135 and 3,132,773, to drive the endless chain in only one direction and to provide a connecting link connected at one end to the carriage and connected at its other end to the chain for reciprocating the carriage. However, the connecting link had to be offset from the plane of movement of the chain so that the reaction forces applied through the connecting link to the chain, which occur in driving the carriage, were laterally offset from the longitudinal centerline of the chain and tended to cause lateral loading of the chain with consequent uneven wear.

SUMMARY OF THE INVENTION

It is the object of the present invention to overcome the disadvantages of the prior art by providing a waste water treatment apparatus of the type in which a tank cleaning head is supported on a carriage movable along a rail extending across the top of the tank and in which the carriage support rail is formed as a part of a box-shaped beam constructed and arranged to enclose the drive chain and carriage to provide weather protection for the movable parts of the apparatus and safety protection for the operator.

Another object of this invention is to provide a waste water treatment apparatus in accordance with the foregoing object in which the chain is movable along the longitudinal center line of the carriage to substantially avoid lateral loading of the carriage by the driving connection therebetween.

Another object of this invention is to provide a waste water treatment apparatus having an improved arrangement for drivingly connecting a uni-directionally driven endless chain to a carriage to move it back and forth along a treatment tank and which applies the carriage drive forces along the axis of the chain and provides a carriage dwell period at each end of the tank.

Accordingly, the present invention provides, in a waste water treatment apparatus of the type including a tank, a carriage support rail extending across the top of the tank, a carriage mounted on the rail for movement therealong, tank cleaning means mounted on the carriage for movement thereby and a carriage drive including a drive motor and an endless chain entrained over a pair of sprockets adjacent opposite ends of the tank and having upper and lower runs paralleling the carriage and means connecting the carriage to the chain for movement thereby back and forth along the carriage support rail, the improvement wherein the carriage support rail comprises a box-shaped beam having a top wall, spaced side walls depending from the top wall and a pair of inwardly extending carriage support flanges on the side walls defining a lengthwise extending track opening between the flanges, means mounting the sprockets inside the beam adjacent the ends of the box-shaped beam to support the endless chain inside the box-shaped beam with its upper and lower runs in a plane substantially medially between the spaced side walls of the box-shaped beam, the carriage including a pair of laterally spaced wheel mounting members extending inside the box-shaped beam at relatively opposite sides of the endless chain and at least one wheel mounted on each of the wheel mounting members inside the beam and in rolling engagement with the upper side of the respective one of the carriage support flanges on the box-shaped beam to support the carriage for movement along the beam.

The present invention also provides, in a waste water treatment apparatus of the type including a tank, a carriage mounted on a support rail for movement across the top of the tank, a carriage drive including a drive motor and an endless chain entrained over a pair of sprockets adjacent opposite ends of the tank and having upper and lower runs paralleling the support rail, the improvement wherein the chain has a drive lug extending outwardly intermediate the side edges of the chain and the carriage has upper and lower followers rigidly mounted on the carriage and positioned to be alternately engaged by the drive lug as it moves respectively along the upper and the lower runs of the chain to reciprocate the carriage along the tank and provide a carriage dwell at each end of the tank.

These, together with other objects, features and advantages of the present invention will become apparent from the following description when taken in connection with the accompanying drawings wherein:

FIG. 1 is a top plan view through a waste water treatment apparatus embodying the present invention;

FIG. 2 is a transverse vertical sectional view through the waste water treatment apparatus taken on the plane 2—2 of FIG. 1;

FIG. 3 is a fragmentary transverse sectional view through the carriage and carriage supporting beam taken on the plane 3—3 of FIG. 1 and showing the parts on a larger scale than FIG. 1;

FIG. 4 is a transverse sectional view taken on the plane 4—4 of FIG. 1 and illustrating the carriage supporting beam on a larger scale than FIG. 1;

FIG. 5 is a fragmentary longitudinal sectional view through the carriage support beam and carriage taken on the plane 5—5 of FIG. 3 and showing the carriage at one end of the beam; and FIG. 6 is a fragmentary longitudinal sectional view through the carriage support beam and carriage taken on the plane 6—6 of FIG. 3 and illustrating the carriage at the other end of the beam.

Referring now more specifically to the accompanying drawings, there is illustrated a waste water treatment apparatus such as a clarifier including a tank 10 having a bottom 11, side walls 12 and end walls 13 extending between the side walls. A tank cleaning head 14 is mounted for movement along the bottom and is supported on a carriage 15 mounted on a rail 16 that extends across the top of the tank generally parallel to the side walls 12. Waste water is supplied to the tank through a waste water inlet, herein shown as including an inlet launder 17 communicating through inlet ports 17a with the tank, and treated water is delivered from the tank through a treated water outlet, herein comprising an outlet weir 18 and trough 18a that communicates with an outlet passage 18b as shown in FIG. 1, an inlet baffle 17b is provided in the tank to extend crosswise of the inlet ports 17a and deflect the moving water downwardly. Solids in the water entering the tank from the inlet ports 17a settle to the bottom and clarified liquid flows over the outlet weir 18 and into trough 18a and through the outlet port 18b. Different types of tank cleaning apparatus are used in different waste water treatment apparatus. The tank cleaning apparatus may, for example, be of the suction type or of the scraper type or the combination suction and scraper type shown in the drawings. In the embodiment illustrated, the bottom wall 11 is formed with outer bottom wall portions 11a that are inclined downwardly in a direction crosswise of the path of travel of the head 14 toward a central bottom wall portion 11b. The sludge removal head is formed with a central suction head 14b arranged to pick up sludge along the central bottom portion 11b and side scrapers 14a that extend along the outer bottom wall portions 11a and are provided with preferably resilient scraper blade 14c to aid in conveying the sludge toward the central bottom wall portion for pick-up by the suction head 14b.

The present invention includes an improved track and carriage arrangement in which the operating mechanism and carriage are enclosed to provide weather protection for the chain and carriage and safety protection for the operator. In accordance with the present invention, the track or rail 16 is in the form of a box-shaped beam having a top wall 25, a pair of spaced side walls 26 extending downwardly from opposite side edges of the top wall, and a pair of inwardly directed flanges 27 on the side walls and spaced below the top wall and providing a lengthwise extending track opening 28 therebetween. The box-shaped beam is supported by beam support brackets 29 on the end walls 13 of the settling tank and extends generally parallel to the side walls and preferably medially therebetween.

The carriage 15 includes a generally channel-shaped body 31 that underlies the beam and a pair of laterally spaced wheel mounting members 32, herein shown in the form of generally upright plates that are secured to the carriage body 31 and extend upwardly through the track opening 28 and into the beam. At least one and preferably two carriage support wheels 33 are rotatably mounted on each of the wheel mounting members 32 and disposed in rolling engagement with a respective one of the flanges 27 on the beam. As best shown in FIG. 3, the wheels 33 are rotatably mounted on stub shafts 34 secured to the wheel mounting members 32 and the wheels preferably have flanges 33a adapted to extend alongside the inner edges of the flanges 27 on the beam to laterally guide the carriage for movement along the beam. Rollers 36 are advantageously provided on the carriage and arranged to engage the underside of the top wall 25 on the beam to limit upward movement of the carriage relative to the beam and inhibit tilting or cocking of the carriage in a direction crosswise of the beam. As shown in FIG. 3, rollers 36 are mounted by stub shafts 37 on the wheel mounting members 32.

The carriage 15 is moved back and forth along the beam by an endless drive chain 38 that is entrained over drive and idler sprockets 39 and 40 adjacent opposite ends of the beam for movement in a generally upright plane substantially medially between the side walls 26 of the beam. As shown in FIG. 1, idler sprocket 40 is rotatably supported as by a shaft 40a at one end of the beam and the drive sprocket 39 is secured to a drive shaft 39a driven by a drive motor 41 through a speed reducer 42. The wheel supporting members 32 on the carriage extend upwardly into the beam at relatively opposite sides of the chain.

The drive motor 41 and speed reducing mechanism 42 are preferably constructed and operated so as to drive the drive sprocket 39 in only one direction and the chain 38 is connected to the carriage to move the carriage back and forth along the beam 16 in response to uni-directional driving of the chain. When the drive sprocket 39 is rotated in one direction, indicated by the arrow a in FIG. 5, the upper run 38a of the chain is moved in one direction indicated by the arrow b in FIG. 5, and the lower run of the chain 38b is moved in the opposite direction, indicated by the arrow C in FIG. 5. The present invention also includes an improved carriage drive in which the chain 38 is provided with a drive lug 41 that extends outwardly from the chain symmetrically between the side edges of the chain for movement by the chain in a closed loop course in the plane of movement of the chain. An upper follower 42a is rigidly mounted on the carriage and overlies the upper run of the chain to be engaged by the drive lug when the drive lug moves along the upper run of the chain and a lower follower 42b is rigidly mounted on the carriage and underlies the lower run of the chain to be engaged by the drive lug when the drive lug moves along the lower run. The upper follower 42a is conveniently in the form of a pin secured to one of the wheel support members 32 at a level above the upper run 38a of the chain in the path of movement of the lug 41 to be engaged thereby so that the carriage is moved in a direction toward the right as viewed in FIGS. 5 and 6 as the drive lug moves along the upper run of the chain. When the upper run reaches one of the sprockets 40, it moves downwardly in an arcuate path and will pass out of engagement with the upper follower 42a as shown in FIG. 5 to interrupt movement of the carriage to the right. The lug continues movement around the sprocket 40 at the end of the chain and then moves along the lower run of the chain until it engages the lower follower 42b. Follower 42b is also conveniently in the form of a pin attached to one of the wheel support members 32 at a location below the lower run 38b of the chain to be engaged by the drive lug as it moves along the lower run and thereby move the carriage in the other direction, that is toward the left as viewed in FIGS. 5 and 6 as the lug moves along its lower run. When the drive lug reaches sprocket 39, it moves in an arcuate path upwardly and out of engagement with the lower follower 42b to interrupt movement of the carriage to the left, as shown in FIG. 6. The upper follower 42a is located adjacent the end of the carriage that leads as the drive lug moves along the upper run and the lower follower 42b is located adjacent the end of the carriage that leads as the drive lug moves along the lower run. Thus, the carriage is pulled in both directions by the drive lug. In addition, there is a time between the time the drive lug moves out of engagement with one of the followers and into engagement with the other of the followers and this provides a dwell period for the carriage at each end of the tank.

A chain support and guide is preferably provided and, as best shown in FIGS. 3-6, the chain guide includes a pair of generally channel-shaped members each including a web section 51 and upper and lower legs 52 and 53. The web sections 51 are secured in back-to-back relation and the upper and lower legs 52 and 53 respectively underlie and overlie the upper and lower runs of the chain 38. One of the channel-shaped members is secured as by an L-shaped extension including a vertical leg 54 and a horizontal leg 55 to the top wall 25 of the beam to support the chain guide thereon. Wear pads 56 can be provided on the chain guide. In this manner, the upper and lower runs of the chain are positively guided to maintain the drive lug in engagement with the followers 42a and 42b as the drive lug moves along the upper and lower runs of the chain respectively.

Any suitable arrangement such as a syphon type pump, air-lift pump, or motor driven pump may be provided for pumping sludge from the pick-up head 14 and for delivering the sludge to a sludge outlet. In the embodiment shown, the pick-up head 14 is connected through a pipe 58 to a mounting plate 59 secured to the underside of the carriage 31, and compressed air is introduced through a fitting 58a adjacent the lower end of the pipe 58 to provide an air-lift pump for pumping sludge upwardly from the bottom of the tank. A lateral sludge discharge pipe 62 extends laterally from the upper end of the pipe 58 to a sludge trough 63 extending lengthwise of the tank. A counter-balance weight 64 is adjustably mounted on a bracket 65 at the side of the pipe 58 opposite discharge pipe 62 to enable counterbalancing of the off-center weight of pipe 62. Sludge trough 63 conveys the sludge to a sludge outlet located at the end of the tank. Any suitable arrangement may be provided for supplying air under pressure to the fitting 58a and, as shown in FIG. 1, an air pump or blower 68 is provided adjacent one end of the tank and connected through a flexible air delivery line 69 festooned along a cable 70 and extending downwardly alongside pipe 58 to the fitting 58a. Alternatively, the air pump or blower could be mounted on the carriage for movement therewith and connected to a power supply through a flexible electrical cable.

From the foregoing it is through that the construction and operation of the clarifying apparatus will be readily understood. The box-shaped beam supports the carriage for movement along the top of the tank and encloses the drive chain and the carriage including the carriage support wheels. This protects the drive chain and the wheels and wheel bearings from weather and also provides a safety enclosure for the chain and carriage to protect the operator. Since the chain 38 is movable in a path that extends through the longitudinal center-line of the carriage, the carriage is longitudinally symmetrical with respect to the chain and forces exerted on the carriage by the chain are along the longitudinal center-line of the carriage and do not tend to cause tilting or cocking of the carriage. Conversely, the reaction forces on the chain which occur in driving the carriage are disposed in the plane of the chain so that lateral loading of the chain is effectively avoided. In this manner, improved operation and longer chain life will be achieved. Further, the carriage drive allows the carriage to dwell for a period at each end of the tank for additional cleaning time at each end of the tank.

The embodiments of the invention in which an exclusive property or privilege is claimed are defined as follows:

1. In a waste water treatment apparatus including a tank having an open top and fluid inlet and fluid outlet means communicating with the tank, a generally horizontal carriage support rail extending across the top of the tank, a carriage mounted in the rail for movement therealong over the top of the tank, tank cleaning means mounted on the carriage and extending downwardly from the carriage into the tank for movement with the carriage along the tank, carriage drive means including a drive motor and an endless chain entrained over a pair of sprockets having upper and lower runs generally paralleling the carriage support rail, and means connecting the carriage to the chain for movement thereby back and forth along the carriage support rail, the improvement wherein said carriage support rail comprises a box-shaped beam having a top wall and spaced side walls extending downwardly from the top wall and a pair of inwardly extending carriage support flanges on the side walls spaced apart to define a track opening therebetween, means mounting said sprockets inside the box-shaped beam adjacent its end to support said chain inside the beam with the upper and lower runs of the chain extending lengthwise of an upright plane substantially medially between the spaced side walls of the beam, said carriage including first and second laterally spaced wheel mounting members extending inside said box-shaped beam at relatively opposite sides of said endless chain, and first and second carriage support wheel means respectively mounted on said first and second wheel mounting members inside said beam and in rolling engagement with the upper side of a respective one of the carriage support flanges on the box-shaped beam to support the carriage for movement along the beam, said first and second carriage support wheel means being spaced from relatively opposite sides of said endless chain with their axes at a level intermediate the upper and lower runs of the chain.

2. A waste water treatment apparatus according to claim 1 including rollers on the carriage engaging the underside of said top wall of the box-shaped beam.

3. A waste water treatment apparatus according to claim 1 including a chain support rail attached to the top wall of the box-shaped beam at the inner side thereof and extending downwardly between the first and second carriage support wheel means and underlying the upper run of the endless chain.

4. A waste water treatment apparatus according to claim 1 including a drive lug extending outwardly from said chain, an upper follower rigidly mounted on the carriage at a location to be engaged by the drive lug on the chain when the lug is moving along the upper run of the chain for moving the carriage in one direction and a lower follower rigidly mounted on the carriage at a location to be engaged by the drive lug on the chain when the lug is moving along the lower run of the chain for moving the carriage in the other direction.

5. A waste water treatment apparatus according to claim 4 including a chain support attached to the top wall of the box-shaped beam and including a first chain guide rail underlying the upper run of the chain and a second chain guide rail overlying the lower run of the chain.

6. A waste water treatment apparatus according to claim 1 wherein said drive means is operative to drive said endless chain in only one direction, said endless chain having a drive lug extending outwardly therefrom intermediate the side edges of the chain for movement in a closed loop course in said upright plane, an upper follower rigidly mounted on the carriage and overlying the upper run of said chain to be engaged by the drive lug when the drive lug is moving along the upper run of the chain for moving the carriage in one direction, the drive lug moving out of engagement with the upper follower when the lug moves downwardly over one of said sprockets whereby to interrupt movement of the carriage in said one direction, a lower follower rigidly mounted on the carriage and underlying the lower run of the chain to be engaged by the drive lug when the drive lug is moving along the lower run of the chain for moving the carriage in the other direction, the drive lug moving out of engagement with the lower follower when the drive lug moves upwardly around the other of said sprockets whereby to interrupt movement of the carriage in said other direction.

7. A waste water treatment apparatus according to claim 6 wherein said upper and lower followers are spaced apart in a direction lengthwise of said carriage.

8. A waste water treatment apparatus according to claim 6 wherein the upper follower is located adjacent the end of the carriage that leads when the carriage is moved in said one direction and said lower follower is located adjacent the end of the carriage that leads when the carriage is moved in said other direction.

9. A waste water treatment apparatus according to claim 6 including chain guide means underlying the upper run of said chain means and overlying the lower run of said chain means.

10. In a waste water treatment apparatus including a tank having an open top and fluid inlet and fluid outlet means communicating with the tank, carriage support rail means extending along the tank, a carriage mounted on the carriage support rail means for movement therealong over the top of the tank, tank cleaning means mounted on the carriage and extending downwardly from the carriage into the tank for movement along the tank with the carriage, carriage drive means including a drive motor and endless chain means entrained over a pair of sprockets spaced apart lengthwise of the tank and having generally horizontal upper and lower runs with their longitudinal centerlines disposed in an upright plane paralleling the carriage support rail means, the improvement wherein said drive means is operative to drive said endless chain means in only one direction, said endless chain means having a drive lug extending outwardly therefrom symmetrically between the side edges of the chain for movement in a closed loop course in said upright plane, an upper follower rigidly mounted on said carriage and overlying the upper run of said chain means to be engaged by the drive lug when the drive lug is running along the upper run of said chain means for moving the carriage in one direction, the drive lug moving out of engagement with the upper follower when the lug moves downwardly around one of said spaced sprockets whereby to interrupt movement of said carriage in said one direction, a lower follower rigidly mounted on the carriage and underlying the lower run of the chain means to be engaged by the drive lug when the drive lug is moving along the lower run of the chain means for moving the carriage in the other direction, the drive lug moving out of engagement with the lower follower when the lug moves upwardly around the other of the sprockets whereby to interrupt movement of said carriage in said other direction, said upper and lower followers being spaced apart in a direction lengthwise of said carriage and said upper follower being located adjacent the end of the carriage that leads when the carriage is moved in said one direction and said lower follower being located adjacent the end of the carriage that leads when the carriage is moved in said other direction.

11. A waste water treatment apparatus according to claim 10 including chain guide means underlying the upper run of said chain means and overlying the lower run of said chain means.

12. In a waste water treatment apparatus including a tank having an open top and fluid inlet and fluid outlet means communicating with the tank, a generally horizontal carriage support rail extending across the top of the tank, a carriage mounted in the rail for movement therealong over the top of the tank, tank cleaning means mounted on the carriage and extending downwardly from the carriage into the tank for movement with the carriage along the tank, carriage drive means including a drive motor and an endless chain entrained over a pair of sprockets having upper and lower runs generally paralleling the carriage support rail, and means connecting the carriage to the chain for movement thereby back and forth along the carriage support rail, the improvement wherein said carriage support rail comprises a box-shaped beam having a top wall and spaced side walls extending downwardly from the top wall and a pair of inwardly extending carriage support flanges on the side walls spaced apart to define a track opening therebetween, means mounting said sprockets inside the box-shaped beam adjacent its ends to support said chain inside the beam with the upper and lower runs of the chain extending lengthwise of an upright plane substantially medially between the spaced side walls of the beam, said carriage including a pair of laterally spaced wheel mounting members extending inside said box-shaped beam at relatively opposite sides of said endless chain, and at least one wheel mounted on each of said wheel mounting members inside said beam and in rolling engagement with the upper side of a respective one of the carriage support flanges on the box-shaped beam to support the carriage for movement along the beam, said drive means being operative to drive said endless chain in only one direction, said endless chain having a drive lug extending outwardly therefrom intermediate the side edges of the chain for movement in a closed loop course in said upright plane, an upper follower rigidly mounted on the carriage and overlying the upper run of said chain to be engaged by the drive lug when the drive lug is moving along the upper run of the chain for moving the carriage in one direction, the drive lug moving out of engagement with the upper follower when the lug moves downwardly over one of said sprockets whereby to interrupt movement of the carriage in said one direction, a lower follower rigidly mounted on the carriage and underlying the lower run of the chain to be engaged by the drive lug when the drive lug is moving along the lower run of the chain for moving the carriage in the other direction, the drive lug moving out of engagement with the lower follower when the drive lug moves upwardly around the other of said sprockets whereby to interrupt movement of the carriage in said other direction, said upper and lower followers being spaced apart in a direction lengthwise of said carriage and said upper follower being located adjacent the end of the carriage that leads when the carriage is moved in said one direction and said lower follower being located adjacent the end of the carriage that leads when the carriage is moved in said other direction, and chain guide means underlying the upper run of said chain means and overlying the lower run of said chain means.

* * * * *